Sept. 10, 1929.                 P. H. D. WINSOR                 1,728,147
                               TOOTH PASTE EJECTOR
                               Filed Nov. 19, 1927
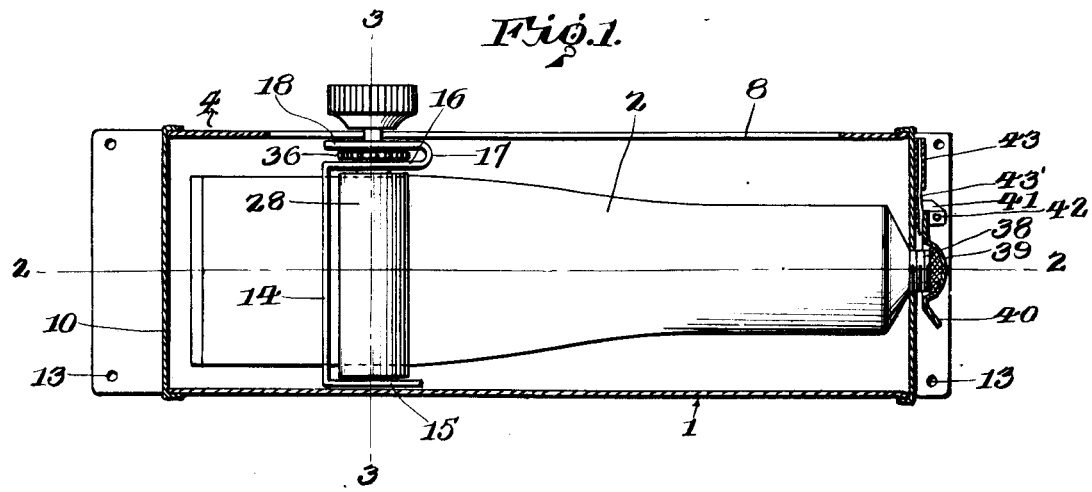
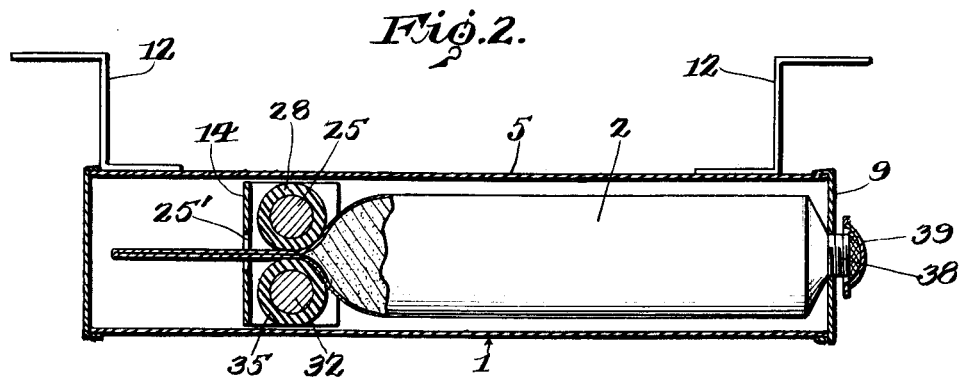
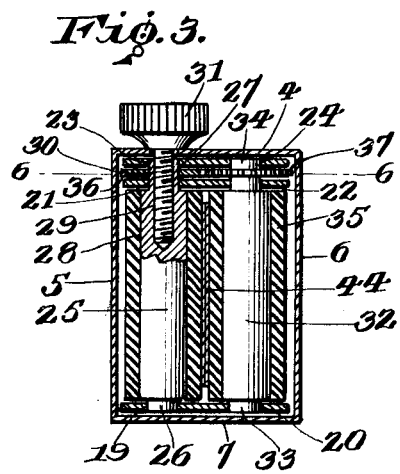 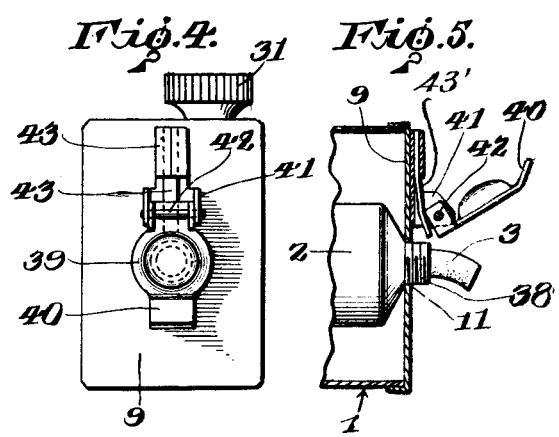
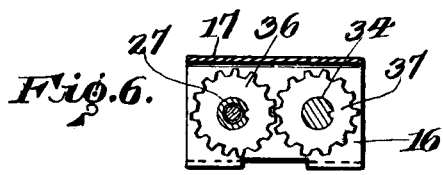
INVENTOR.
Philip H. D. Winsor
BY
Geo. P. Kimmel
ATTORNEY.

Patented Sept. 10, 1929.

1,728,147

UNITED STATES PATENT OFFICE.

PHILIP H. D. WINSOR, OF LODI, CALIFORNIA.

TOOTH-PASTE EJECTOR.

Application filed November 19, 1927. Serial No. 234,524.

This invention relates to a dispensing device designed primarily for dispensing from a collapsible container tooth paste, shaving cream, etc., but it is to be understood that a dispensing device, in accordance with this invention, may be employed for any purposes for which it is found applicable, and the invention has for its object to provide, in a manner as hereinafter set forth, a device for dispensing the contents of a collapsible container in an economical, convenient and sanitary manner.

Further objects of the invention are to provide, in a manner as hereinafter set forth, a dispensing device for the purpose referred to which is simple in its construction and arrangement, strong, durable, sanitary, compact, thoroughly efficient in its use, conveniently operated, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a sectional plan of a dispensing device, in accordance with this invention, showing the adaptation thereof with respect to a collapsible container.

Figure 2 is a longitudinal sectional view of the device showing the adaptation thereof with respect to a collapsible container, with the latter partly collapsed, and taken on line 2—2 Figure 1.

Figure 3 is a section on line 3—3 Figure 1.

Figure 4 is a front elevation of the device.

Figure 5 is a fragmentary view in section of the dispensing end of the device.

Figure 6 is a fragmentary view illustrating the means for operating the compressing element.

Referring to the drawings in detail 1 generally indicates a receptacle, open at each end and of a size to have suspended therein a container which is to be collapsed for the purpose of expelling or dispensing the contents thereof therefrom. As illustrated by way of example the receptacle 1 is of rectangular contour and is adapted to have suspended therein a collapsible tube 2 containing a tooth paste or shaving cream as indicated at 3.

The receptacle 1 comprises a top wall 4, a pair of side walls 5, 6 and a bottom 7. The top wall 4 at one side of its longitudinal median is formed with a lengthwise extending slot 8 of appropriate length. The outer end of the receptacle 1 is closed by a removable, flanged end cap 9 and the inner end of the receptacle 1 is closed by a flanged end cap 10. The cap 9 is provided with a centrally disposed opening 11 for a purpose to be presently referred to. Secured to and extended from the side wall 5 is a pair of brackets 12, provided with apertures 13 for the passage of holdfast devices to fixedly secure the receptacle 1 in stationary position or to any desirable support.

Slidably mounted in the receptacle 1 is a yoke-shaped carriage, carrier or cage formed of a rectangular rear part 14, a forwardly extending rectangular bottom part 15, a forwardly extending rectangular top part 16 terminating in an upstanding bend 17 which merges into a rearwardly directed bearing member 18 arranged in superposed spaced relation with respect to the top part 16. The parts 15 and 16 project forwardly from the ends of the part 14. The part 15 is provided with a pair of spaced openings 19, 20. The part 16 is provided with a pair of spaced openings 21, 22 and the part or member 18 is formed with a pair of spaced openings 23, 24. The openings 19, 21 and 23 are arranged in alignment. The openings 20, 22 and 24 are arranged in alignment. The rear part 14 is formed with a vertically disposed slot 25' of appropriate width. The carriage or cage is formed from a single length of sheet metal bent to provide the parts 14, 15 and 16, the bend 17 and member 18. Positioned within the carrier or cage is a pair of spaced, rotatable compressing elements and one includes a solid cylindrical core 25 provided at one end with a stub shaft 26 of reduced diameter with respect to the diameter of the body of the core and said stub shaft is positioned in the opening 19. The upper end of the core 25 is formed with a tubular shaft 27 of greater length than the shaft 26 and said shaft 27 extends through the openings 21, 23. The core 25 is covered by a cylinder 28 of resilient material, preferably rubber. The cylinder 28 corresponds to the length of the core 25. The core 25 is provided with a socket 29 which registers with the inner face of the shaft 27 and the inner face of the latter, as well as the wall of the socket 29 is threaded. Extending through the shaft 27 and into the socket 29, as well as threadedly engaging with said shaft and the wall of the socket, is a peripherally threaded screw 30 which extends through the slot 8 and carries on its outer end a removable head 31.

The other compressing element comprises a cylindrical, solid core 32 provided at one end with a stub shaft 33 which is arranged within the opening 20. Extending from the other end of the core 32 is a stub shaft 34 of greater length than the shaft 33. The shaft 34 extends through the openings 22 and 24. The core 32 is covered by a cylinder 35 of resilient material, preferably rubber. The compressing elements are arranged in spaced relation with respect to each other. Fixed to the shaft 27 and arranged between the part 16 and member 18 is a pinion or small gear 36 which meshes with a pinion or small gear 37 keyed to the shaft 34 and arranged between the part 16 and member 18. When that compressing element having the head 31 connected therewith is rotated, the other compressing element will also be rotated, due to the meshing of the pinions or gears 36 and 37.

When the container 2, is arranged within the receptacle 1, the neck 38 of the container 2 is extended through the opening 11 and prior to the extending of the neck through said opening the closure cap for the container has been removed. The neck 38 projects a substantial distance forwardly of the end cap 9. The neck 38, of the container 2, when the latter is mounted in the receptacle 1, is closed by a spring controlled cap 39 having a finger piece 40. The cap 39 is pivotally connected to a pair of ears 41, as at 42. The ears 41 are carried on the lower end of a hanger 43 which is secured to the outer face of the end cap 9 above the opening 11. A controlling spring for the cap 39 is indicated at 43'. When the container 2 is arranged within the receptacle 1, the flat inner end 44 thereof is extended between the compressing elements and passes through slot 25'.

When the container 2 is mounted within the receptacle 1, for the purpose of having the contents thereof discharged or expelled therefrom it is inserted between the compressing elements and the neck 38 extends through the end cap 9. The end cap 9 is removable and after the container has been mounted in the manner as stated the end cap 9 is secured to the forward end of the receptacle 1. Any suitable means is employed for securing the end cap 9 in position, but preferably a frictional lock can be set up between the receptacle 1 and cap 9. The cap 39 is positioned over the open end of the neck 38. When it is desired to dispense a part of the contents of the container 2, the end cap 39 is moved to the position shown in Figure 5 by a slight pressure on the finger piece 40 in an upward direction. When the desired amount of the material from the container 2 has been expelled therefrom, the cap 39 is moved to closure position as illustrated in Figures 1 and 4 and the spring 43' acts to maintain the same in such position. When the material is expelled from the container, the head 31 is revolved, which in turn will provide for the rotation of the compressing elements and the latter acting upon the container 2 will collapse the same thereby forcing a portion of the contents of the container therefrom for use. The cage or carrier 14 slides towards the cap 9 during the flattening action of the compression elements upon the container 2. The action of dispensing is a positive one.

It is thought that the convenience of the device can be readily understood, as the container is always where it is needed and furthermore the device provides for an economical operation because all the material in the container is removed. The device provides for sanitation because the container is protected by the receptacle and further the action of the compressing elements is such as not to break the container, as is the case when a squeezing action is had by hand with the accompanying mess and loss of material.

Although the preferred embodiment of the invention is as illustrated and described, yet it is to be understood that changes in the details of construction can be had which fall within the scope of the invention as claimed, then furthermore any suitable means or attachment can be employed in connection with the receptacle 1 for supporting tooth brushes or other articles.

What I claim is:

1. A dispensing device for the purpose set forth comprising a receptacle having means at one end for supporting and for the passage of the open neck of a collapsible container, a shiftable closure means carried on the outer face of said end for said open neck, a yoke-shaped, slidable carriage mounted in said receptacle and including top, bottom and rear parts, a bearing member positioned over and spaced from said top part and connected therewith, opposed, rotatable compressing elements positioned within said carriage and adapted to act upon the rear portion of the container for collapsing it in a direction towards said neck to expel the contents of the container, each of said elements including a lower shaft journaled in said bottom part and an upper shaft journaled in said top part and said member, gear connections between said upper shafts to provide for the simultaneous operation of said elements, said gear connections positioned between said member and said top part, means connected to one of said upper shafts and projecting from the top of the receptacle to provide for the simultaneous operation of said elements, said rear part provided with a slot for the passage of the compressed portion of the container and the top of said receptacle having a slot through which extends said means.

2. In a dispensing device for the purpose set forth a slidable compressing means slided upon the rear portion of a collapsible container for collapsing the latter from the rear to front thereof, said means including a yoke-shaped slidable carriage having a vertically disposed slotted rear part and forwardly extending top and bottom parts, said bottom part formed with a pair of spaced openings, a bearing member arranged over said top part, spaced therefrom and connected at the forward end of the top part, said bearing member and top part provided with aligning openings, rotatable, resilient, opposed, spaced, compressing element positioned within the carriage and having lower shafts extending in the openings of said bottom part and further having upper shafts extending in the openings of said top part and bearing member, gear connections between said upper shafts to provide for the simultaneous operation of said elements, one of said upper shafts provided with a socket having a threaded wall, means extending into said socket and connected to the wall thereof to provide and actuated for the synchronous operation of said elements to compress the collapsible container.

3. In a dispensing device for the purpose set forth a compressing means for a collapsible container, said means including a vertically disposed yoke-shaped slidable carriage having a slotted rear part for the passage of the collapsible portion of the container, a top part and a bottom part, said top and bottom parts provided with spaced openings, the openings in the top part registering with the openings in the other part, vertically disposed resilient, rotatable, compressing elements including lower shafts arranged in the openings of said bottom part and upper shafts extending through the openings in said top part, a bearing member spaced from said top part and having openings aligning with the openings in said top part, said upper shafts extending in the openings in said bearing member, gear connections between said upper shafts and positioned between said top part and said bearing member and providing for the simultaneous operation of said compressing elements, means connected to and extended from one of said upper shafts for rotating the compressing element thereby providing for the simultaneous operation of both of said elements.

In testimony whereof, I affix my signature hereto.

PHILIP H. D. WINSOR.